United States Patent
Iijima

(10) Patent No.: US 8,097,858 B2
(45) Date of Patent: Jan. 17, 2012

(54) RADIATION IMAGING APPARATUS, PROCESSING METHOD THEREFOR, AND RADIATION IMAGING SYSTEM

(75) Inventor: Tadahiko Iijima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/693,889

(22) Filed: Jan. 26, 2010

(65) Prior Publication Data

US 2010/0187410 A1    Jul. 29, 2010

(30) Foreign Application Priority Data

Jan. 28, 2009   (JP) .................................. 2009-017130

(51) Int. Cl.
    *G01T 1/24*   (2006.01)
(52) U.S. Cl. .................................. 250/370.09
(58) Field of Classification Search ............... 250/252.1, 250/370.08, 370.09, 393; 378/98
    See application file for complete search history.

(56) References Cited

U.S. PATENT DOCUMENTS

2003/0223539 A1* 12/2003 Granfors et al. ............. 378/98.8
2008/0013686 A1*  1/2008 Kameshima et al. ........... 378/98

FOREIGN PATENT DOCUMENTS

JP        2008-036405 A      2/2008

* cited by examiner

*Primary Examiner* — David Porta
*Assistant Examiner* — Marcus Taningco
(74) *Attorney, Agent, or Firm* — Canon U.S.A., Inc. IP Division

(57) ABSTRACT

An apparatus includes an imaging unit configured to perform imaging by using a plurality of image capture elements for accumulating electric charges, a storage unit configured to store an offset correction image, a correction image generation unit configured, when capturing a radiation image through radiant-ray irradiation, to combine the offset correction image with an image captured by using a part of the plurality of image capture elements through the imaging unit without radiant-ray irradiation to update the offset correction image, and a correction processing unit configured to correct the captured radiation image, based on the offset correction image.

24 Claims, 8 Drawing Sheets

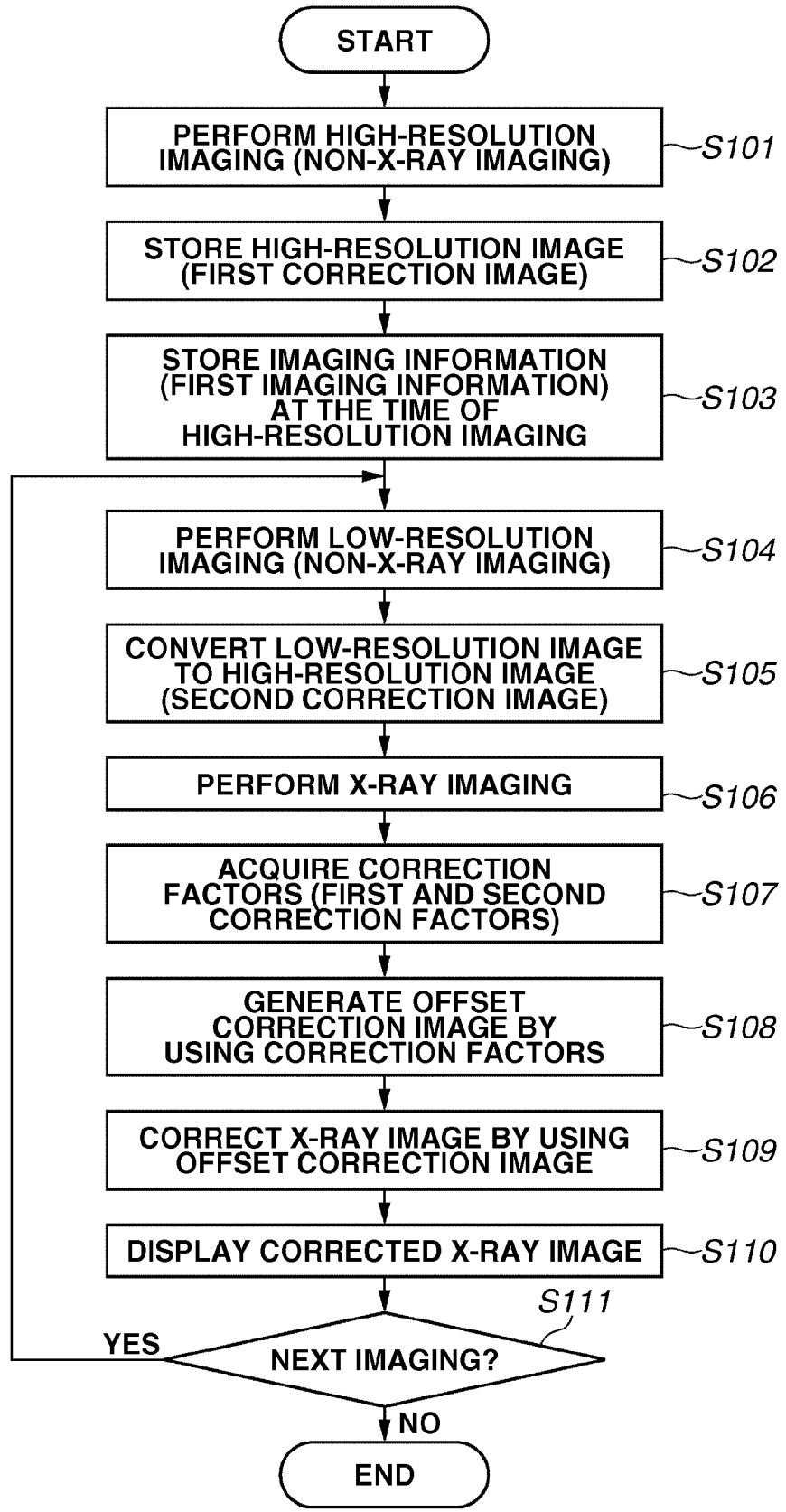

FIG.3A
FORMULA 1
(SECOND CORRECTION FACTOR)
$$A = \text{func}(\Delta \text{temp}, \Delta \text{time})$$
$$= a * \Delta \text{temp} + b * \Delta \text{time}$$
$$(0 \leq A \leq 1)$$
FORMULA 2
(FIRST CORRECTION FACTOR)
$$B = 1 - A$$
$$(0 \leq A \leq 1)$$
FIG.3B
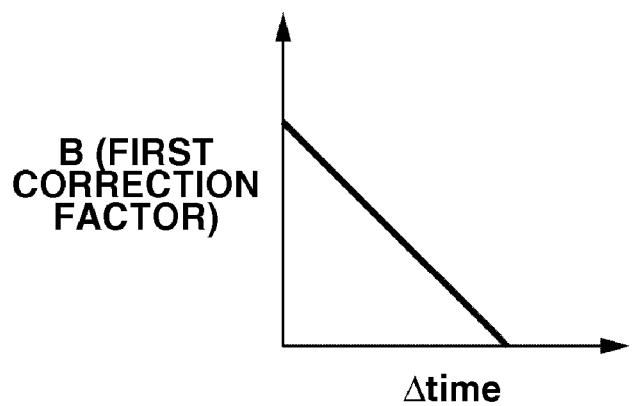
FIG.3C
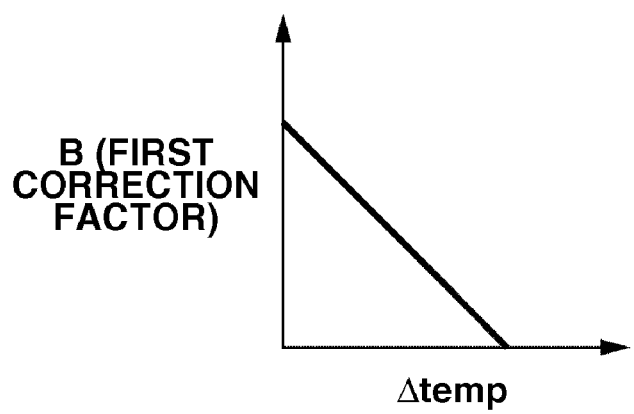

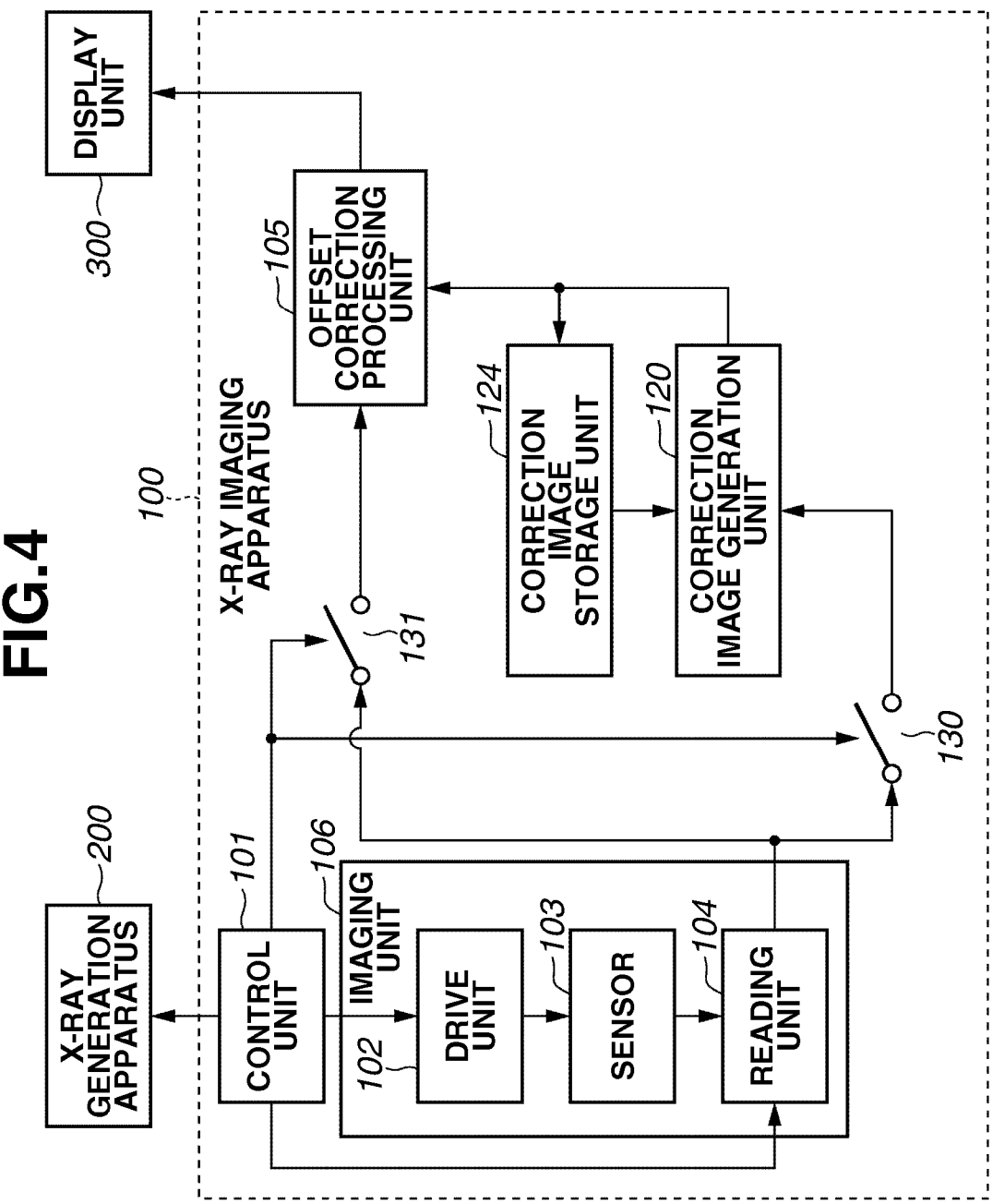

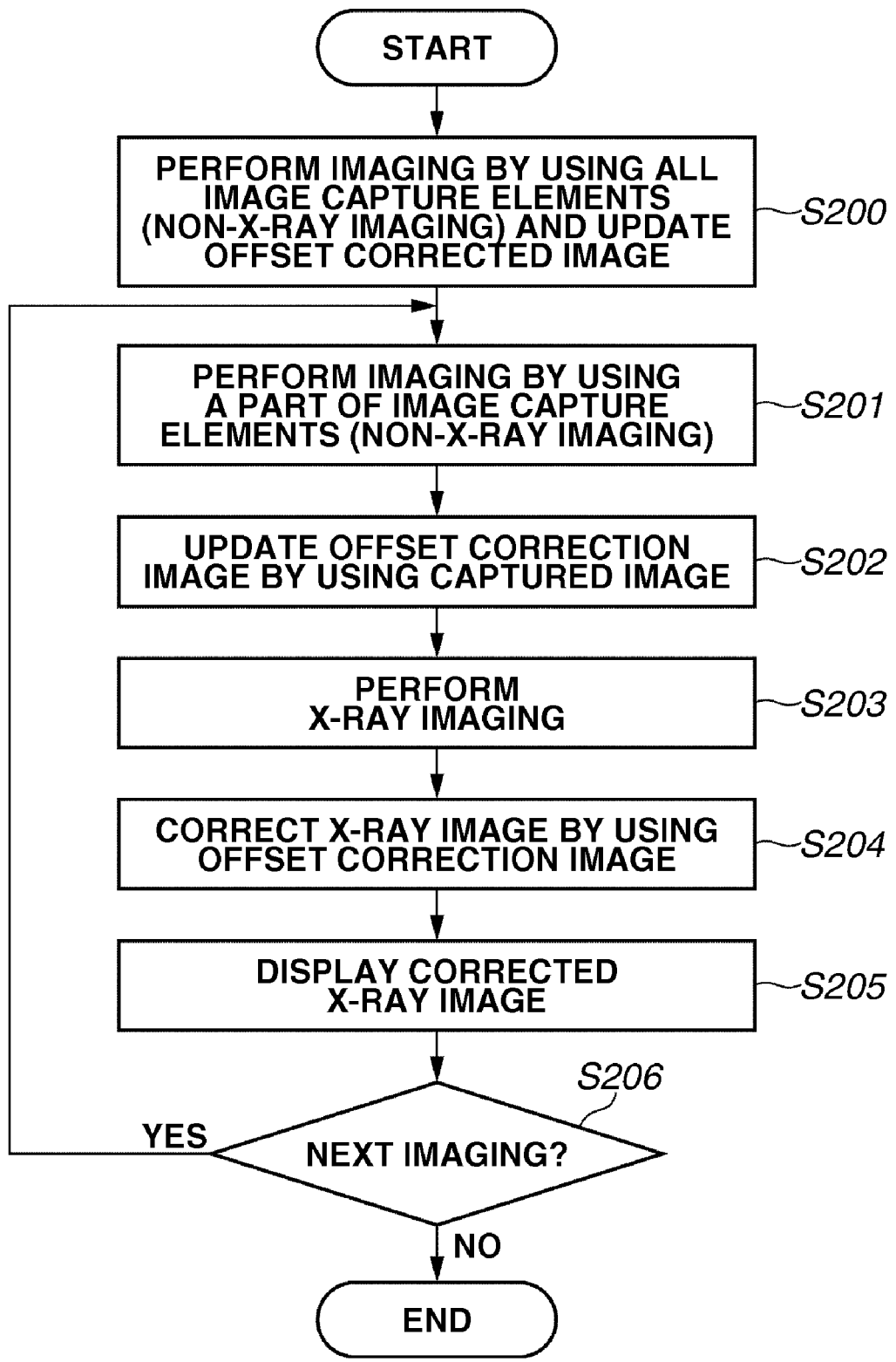

FIG.7
SENSOR READING AREA
(1) 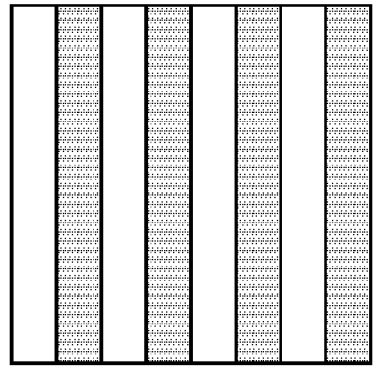
(2) 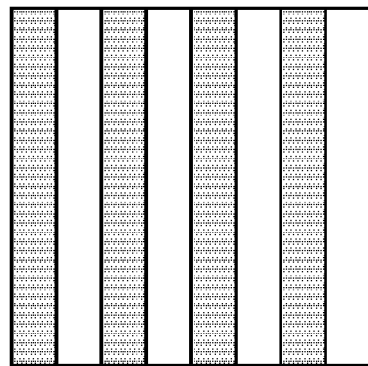
(3) 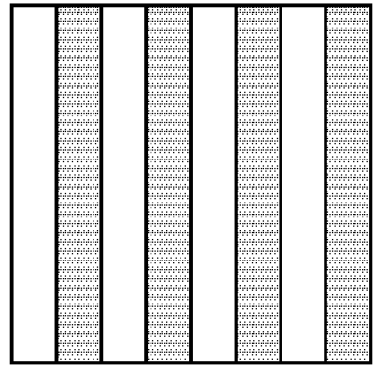
(4) 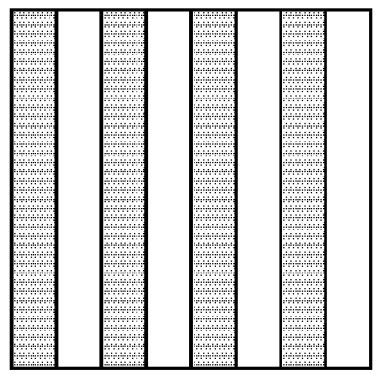
CAPTURED IMAGE
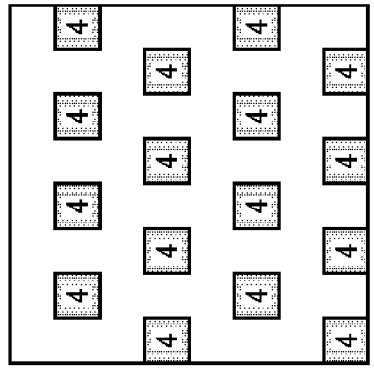
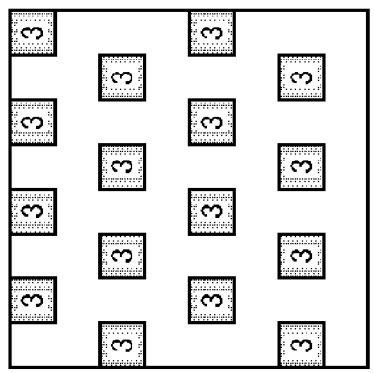
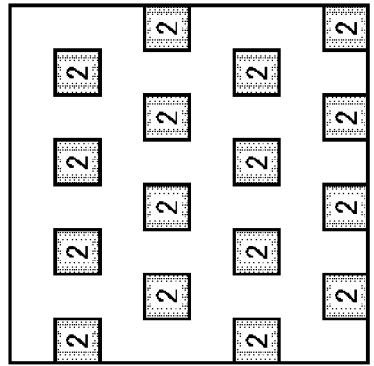
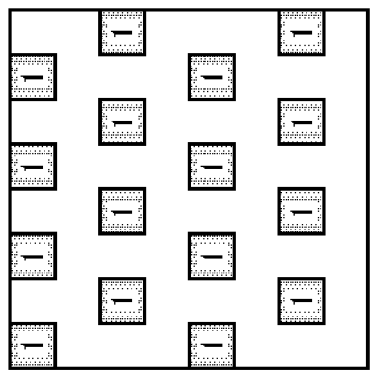

FIG.8
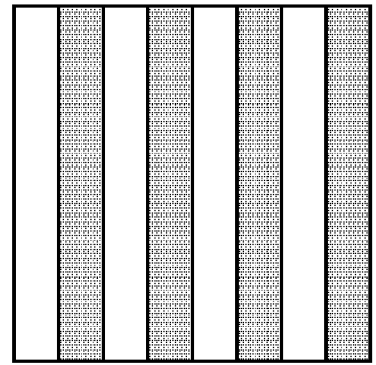
(4)
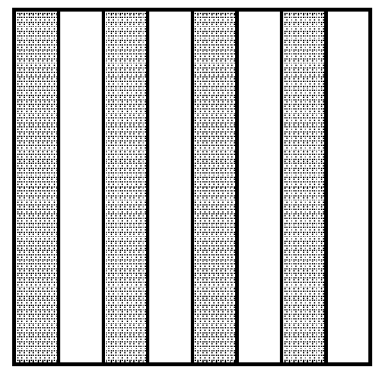
(3)
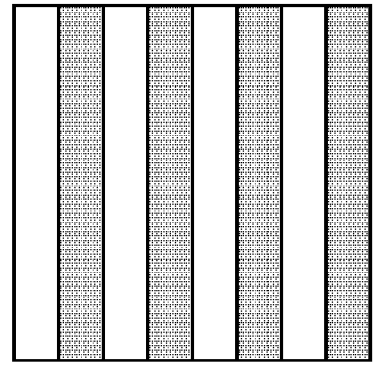
(2)
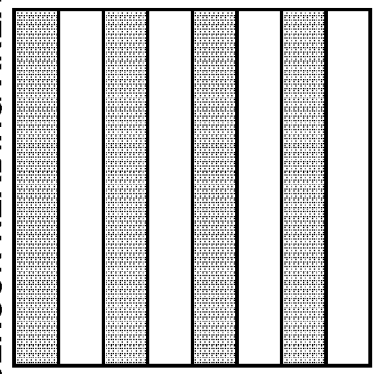
SENSOR READING AREA
(1)
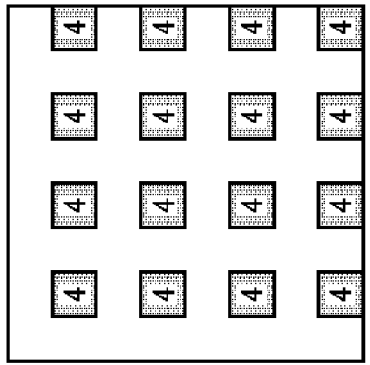
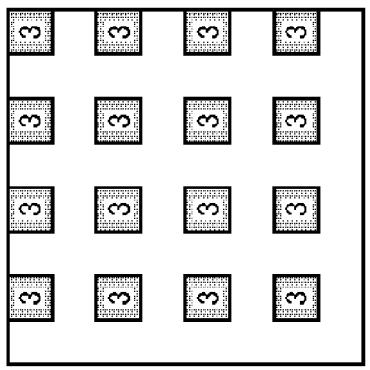
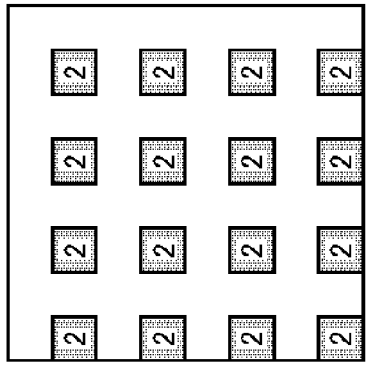
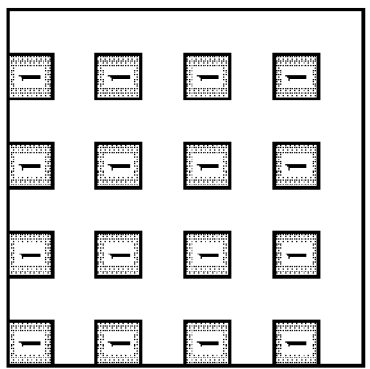
CAPTURED IMAGE

RADIATION IMAGING APPARATUS, PROCESSING METHOD THEREFOR, AND RADIATION IMAGING SYSTEM

BACKGROUND OF THE INVENTION

1. Field of the Invention

The present invention relates to a radiation imaging apparatus, a processing method therefor, and a radiation imaging system.

2. Description of the Related Art

There are known radiation imaging apparatuses that irradiate a subject with a radiant ray (for example, an X ray) to detect the intensity distribution of the radiant ray, which has penetrated the subject to capture its radiation image. Such radiation imaging apparatuses are provided with a sensor to capture a radiation image.

The sensor includes an insulated substrate such as a glass substrate. For example, a flat-panel type area sensor includes a plurality of image capture elements, each including conversion elements and switch elements (Thin film transistors (TFTs)), two-dimensionally arranged on the insulated substrate.

With a radiation imaging apparatus, radiant ray such as the X ray is converted into electric charges by conversion elements and then the TFTs arranged in matrix form are driven. Thus, an electric signal caused by the electric charges accumulated in the image capture elements is read, and a resultant subject image (radiation image) is acquired.

This radiation image (i.e., the read electric signal) contains an offset component generated in the area sensor and a reading unit. Since the above-described offset component is contained in the image captured through radiant-ray irradiation, to remove the offset component from the acquired image, offset correction is to be performed.

The following two different offset correction methods are known. One offset correction method acquires an offset correction image in advance and performs offset correction by using its data. With this method (first method), an electric signal caused by electric charges accumulated in the image capture elements is read from the area sensor in a state where there is no radiant ray or light based thereon incident on the area sensor. Thus, the offset correction image is acquired.

The offset correction image is stored in a memory. Then, at the time of radiant-ray-based imaging, the offset component is removed from the acquired radiation image by using the offset correction image stored in the memory.

The first offset correction method is beneficial for quickly performing imaging since it is not necessary to acquire an offset correction image at each time of imaging. However, it is commonly known that the offset component in a flat-panel type area sensor may be affected by various factors such as temporal change, temperature change, afterimage (an effect by an optical history of preceding frame), defective pixel change, and so on.

This means that the offset component may change and that the first offset correction method does not provide sufficient offset correction. In some cases, for example, offset correction may contrarily degrade the radiation image quality.

The other offset correction method acquires an offset correction image at each time of radiation imaging. With this method (second method), after radiation imaging, an offset correction image is acquired in a state where there is no radiant ray or light based thereon incident on the area sensor. Then, the offset component is removed from the radiation image by using the offset correction image acquired at each time of radiation imaging. The second offset correction method acquires an offset correction image at each time of imaging and therefore takes a comparatively long time.

Japanese Patent Application Laid-Open No. 2008-036405 discusses a technique for partially driving only a part of image capture elements to shorten the time for acquiring an offset correction image. The technique in Japanese Patent Application Laid-Open No. 2008-036405 performs synthetic processing by using specific factors when generating an offset correction image.

Therefore, offset correction using an offset correction image is largely affected by these factors. If appropriate factors are not set, noise is generated in the offset correction image, which may cause degradation of the radiation image quality. In this way, a radiation imaging apparatus uses techniques for shortening the imaging time and appropriately removing the offset component contained in the radiation image.

SUMMARY OF THE INVENTION

According to an aspect of the present invention, an apparatus includes: an imaging unit configured to perform imaging by using a plurality of image capture elements for accumulating electric charges; a storage unit configured to store an offset correction image; a correction image generation unit configured, when capturing a radiation image through radiant-ray irradiation, to combine the offset correction image with an image captured by using apart of the plurality of image capture elements through the imaging unit without radiant-ray irradiation to update the offset correction image; and a correction processing unit configured to correct the captured radiation image, based on the offset correction image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flow chart illustrating exemplary imaging processing in the X-ray imaging system illustrated in FIG. 1.

FIGS. 3A, 3B, and 3C illustrate an exemplary overview of correction factors.

FIG. 4 is a block diagram illustrating an exemplary functional configuration of a radiation imaging system (X-ray imaging system) according to a second exemplary embodiment.

FIG. 5 is a flow chart illustrating exemplary imaging processing in the X-ray imaging system according to the second exemplary embodiment.

FIG. 7 illustrates an exemplary method for driving the image capture elements according to the second exemplary embodiment.

FIG. 8 illustrates an exemplary conventional technique.

DESCRIPTION OF THE EMBODIMENTS

Various exemplary embodiments, features, and aspects of the invention will be described below in detail with reference to the drawings. Although the following exemplary embodiments will be described based on a case where the X ray is applied as radiant ray, the radiant ray is not limited thereto but may be an electromagnetic wave, alpha ray, beta ray, gamma ray, and so on.

Figure 1:
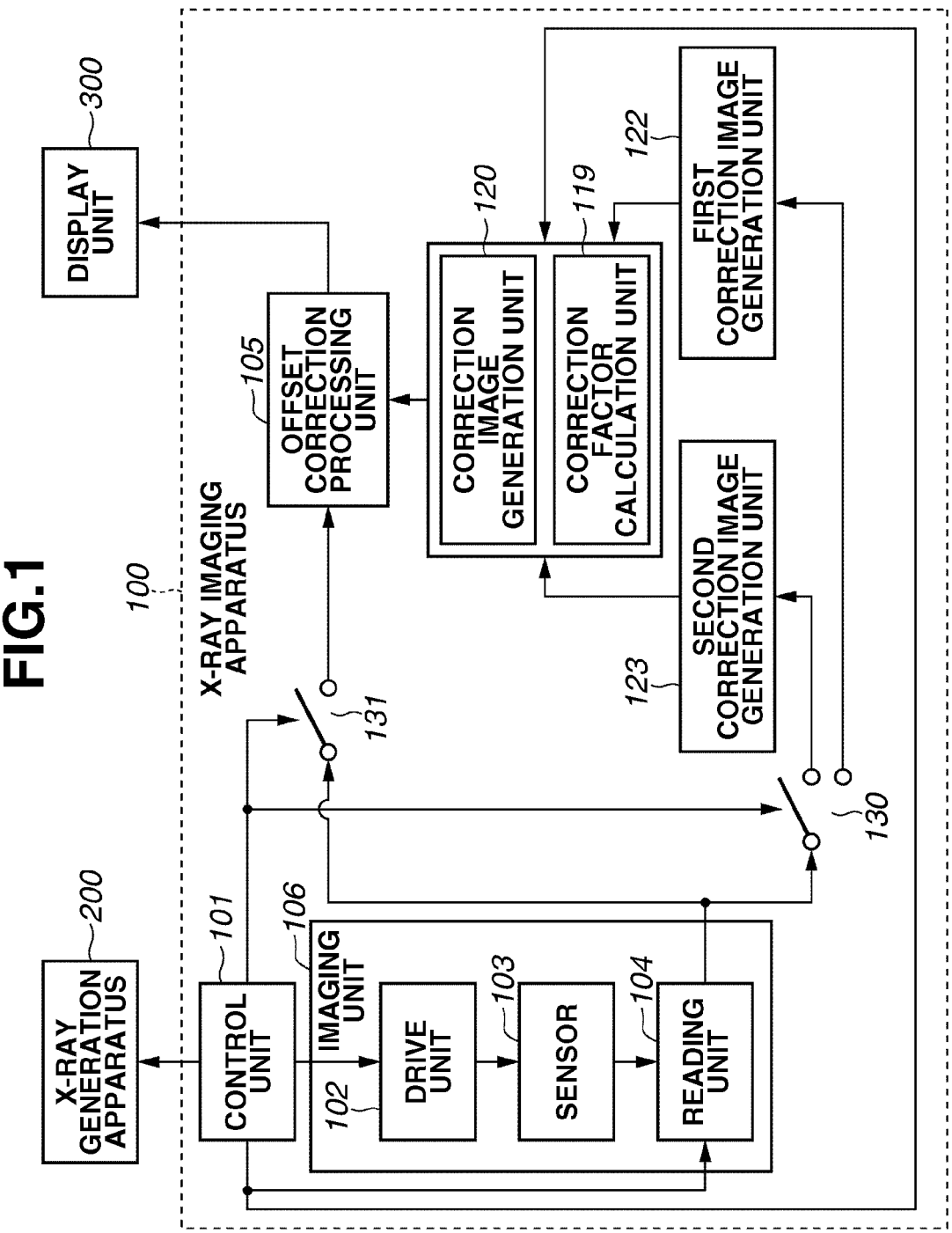
FIG. 1 is a block diagram illustrating an exemplary functional configuration of a radiation imaging system (X-ray imaging system) according to a first exemplary embodiment of the present invention.

FIG. 1 is a block diagram illustrating an exemplary functional configuration of a radiation imaging system (hereinafter referred to as X-ray imaging system) according to a first exemplary embodiment of the present invention.

The X-ray imaging system includes an X-ray imaging apparatus 100, an X-ray generation apparatus 200, and a display unit 300. The X-ray imaging system does not necessarily need to be implemented with the configuration illustrated in FIG. 1. For example, the display unit 300 may be implemented as a part of the X-ray imaging apparatus 100.

The X-ray generation apparatus 200 serves as a radiant ray generation apparatus to irradiate the X ray towards a subject (for example, a human body). The X-ray imaging apparatus 100 serves as a radiation imaging apparatus and captures a subject-based image through detection of an electromagnetic wave that has penetrated the subject. The display unit 300 displays the image (X-ray image) captured by the X-ray imaging apparatus 100.

The X-ray imaging apparatus 100 includes a control unit 101, an imaging unit 106, an offset correction processing unit 105, a correction factor calculation unit 119, a correction image generation unit 120, a first correction image storage unit 122, and a second correction image generation unit 123. The X-ray imaging apparatus 100 also includes switches 130 and 131.

The imaging unit 106 captures a predetermined imaging area. The imaging unit 106 includes a drive unit 102, a sensor 103, and a reading unit 104. The sensor 103 includes a plurality of image capture elements to convert the X ray to an electric signal. The image capture elements (including, for example, conversion elements and switch elements) are arranged in two-dimensional matrix form.

The drive unit 102 drives the image capture elements provided in the sensor 103. The image capture elements are driven by controlling drive lines. The reading unit 104 reads an electric signal caused by electric charges accumulated in the image capture elements to acquire a captured image.

The control unit 101 generally controls operations of the X-ray imaging apparatus 100. The control unit 101, for example, drives the drive unit 102 and selects an output destination of the reading unit 104. Further, the control unit 101 controls not only the X-ray imaging apparatus 100 but also the X-ray generation apparatus 200. For example, the control unit 101 instructs the X-ray generation apparatus 200 to radiate the X ray. The control unit 101 also changes the switches 130 and 131.

The second correction image generation unit 123, before (for example, immediately before) starting imaging through X-ray irradiation, generates a second correction image based on a low-resolution image captured with a low resolution without X-ray irradiation. More specifically, the second correction image generation unit 123 converts the low-resolution image to a high-resolution image (having the same resolution as a first correction image to be described later) to generate the second correction image.

The first correction image storage unit 122, before starting imaging through X-ray irradiation, stores the high-resolution image captured with a high resolution without X-ray irradiation as a first correction image. The first correction image has been affected by a dark current. The above-mentioned high-resolution image refers to an image having a higher resolution than the low-resolution image captured to generate the second correction image, for example, an image having a resolution equivalent to that of an X-ray image acquired through X-ray irradiation.

The correction factor calculation unit 119 calculates correction factors (factors used for image combining) based on imaging information at the time of X-ray imaging as well as imaging information at the time of first correction imaging. There are two different correction factors (first and second correction factors), which will be described later in detail. The correction factor calculation unit 119 is provided with a first correction factor calculation function for calculating the first correction factor, and a second correction factor calculation function for calculating the second correction factor.

The correction image generation unit 120 generates an offset correction image at each time of X-ray imaging. The role of the offset correction image is to eliminate an offset component from the X-ray image. The procedure is performed using correction factors calculated by the correction factor calculation unit 119. The procedure for generating an offset correction image will be described later in detail.

The offset correction processing unit 105 performs such correction (offset correction) as to remove an offset component from the X-ray image, by using the offset correction image. More specifically, the offset correction processing unit 105 subtracts the output (offset correction image) of the correction image generation unit 120 from the output (X-ray image) of the reading unit 104 at the time of X-ray imaging.

An exemplary configuration of the X-ray imaging system has been described. Each of the X-ray imaging apparatus 100, the X-ray generation apparatus 200, and the display unit 300 described above includes a computer. The computer includes a main control unit such as a central processing unit (CPU), and storage units such as a read-only memory (ROM), a random access memory (RAM), and a hard disk drive (HDD).

Further, the computer suitably includes input/output units such as a display unit and a touch panel, and a communication unit such as a network card. These units are connected by buses and controlled by the main control unit that executes a program stored in a storage device.

An exemplary imaging operation in the X-ray imaging system illustrated in FIG. 1 will be described below with reference to FIG. 2.

The X-ray imaging apparatus 100 first performs high-resolution imaging. In this case, X-ray irradiation is not performed. When starting this imaging, the X-ray imaging apparatus 100 changes the switches 130 and 131 through the control unit 101. With this switching, the switch 130 is connected to the first correction image storage unit 122, and the switch 131 is disconnected from the offset correction processing unit 105.

When this switching is completed, in step S101, the X-ray imaging apparatus 100 controls the drive unit 102 and the reading unit 104 through the control unit 101 to perform high-resolution imaging. In steps S102 and S103, the X-ray imaging apparatus 100 stores in the first correction image storage unit 122 an output (first correction image) of the reading unit 104 and relevant imaging information (first imaging information). The imaging information includes, for example, temperature, frame rate, electric charge accumulation time, elapsed time from the start of imaging, and so on.

Then, the X-ray imaging apparatus 100 performs low-resolution imaging. In this case, X-ray irradiation is not performed similarly to the case of high-resolution imaging. When starting this imaging, the X-ray imaging apparatus 100 changes the switch 130 through the control unit 101 to connect the switch 130 to the second correction image generation unit 123. The switch 131 is left disconnected from the offset correction processing unit 105.

When this switching is completed, in step S104, the X-ray imaging apparatus 100 controls the drive unit 102 and the reading unit 104 through the control unit 101 to perform low-resolution imaging. In step S105, the X-ray imaging apparatus 100 acquires an output (low-resolution image) of the reading unit 104 and then converts the acquired low-resolution image to a high resolution image through the second correction image generation unit 123. The second correction image generation unit 123 transmits the high-resolution image acquired with this conversion to the correction factor calculation unit 119 as the second correction image.

The X-ray imaging apparatus 100 starts imaging through X-ray irradiation. In this case, the X-ray imaging apparatus 100 changes the switches 130 and 131 through the control unit 101. With this switching, the switch 130 is adapted to disconnect the reading unit 104 from the first correction image generation unit 122 and the second correction image generation unit 123 and the switch 131 is connected to the offset correction processing unit 105.

When this switching is completed, in step S106, the X-ray imaging apparatus 100 instructs the X-ray generation apparatus 200 through the control unit 101 to perform X-ray irradiation, and controls the drive unit 102 and the reading unit 104 to perform X-ray imaging. Then, the X-ray imaging apparatus 100 acquires an output (X-ray image) of the reading unit 104 and then transmits imaging information at the time of X-ray imaging (X-ray imaging information) to the correction factor calculation unit 119.

In step S107, upon reception of the imaging information, the correction factor calculation unit 119 acquires the first and second correction factors by which the first and second correction images are to be multiplied, respectively. These correction factors are acquired based on the X-ray imaging information and the first imaging information.

More specifically, the correction factors are acquired based on a difference in a specific imaging parameter value between both pieces of imaging information. For example, it is possible to use one or more of differences in imaging temperature, imaging frame rate, electric charge accumulation time, elapsed time from the start of imaging, and so on.

As the difference in a specific imaging parameter value, formulas 1 and 2 of FIG. 3A use, for example, the difference in temperature ($\Delta temp$) and the difference in electric charge accumulation time ($\Delta time$). The second correction factor is acquired by the sum of the difference in temperature ($\Delta temp$) multiplied by a predetermined factor "a" and the difference in electric charge accumulation time ($\Delta time$) multiplied by a predetermined factor "b" (formula 1).

The first correction factor is acquired by subtracting the second correction factor from 1 (formula 2). That is, the formula 1 derives a value of the second correction factor, which is between 0 and 1 (inclusive).

When the two correction factors are acquired in this way, the X-ray imaging apparatus 100 generates an offset correction image through the correction image generation unit 120. When generating an offset correction image, the first correction image is multiplied by the first correction factor and the second correction image is multiplied by the second correction factor, and the two resultant values are added. In step S108, the offset correction image is acquired.

Then, the X-ray imaging apparatus 100 corrects through the offset correction processing unit 105 the X-ray image captured in step S106. More specifically, in step S109, the offset correction processing unit 105 subtracts the offset correction image from the X-ray image to acquire an X-ray image from which the offset component has been removed. When this correction is completed, the X-ray imaging apparatus 100 transmits the corrected X-ray image to the display unit 300. In step S110, the display unit 300 displays the received X-ray image.

If X-ray imaging is performed again (YES in step S111), the processing returns to step S104. If imaging is terminated (NO in step S111), the processing in FIG. 2 ends.

The first correction image captured and stored in steps S101 to S103 may be updated at a timing, for example, when the X-ray imaging apparatus 100 is activated. However, the timing of updating is not limited thereto.

Although low-resolution imaging is performed in step S104 before X-ray imaging in step S106 in the description above, it is also possible to perform processing of steps S104 and S105 after step S106.

The above-mentioned offset correction image generated in step S108 will be described below.

When the imaging information at the time of first correction imaging (at the time of high-resolution imaging) nearly equals the imaging information at the time of X-ray imaging (i.e., with a small difference in an imaging parameter value between both pieces of imaging information), an offset correction image largely affected by the first correction image is acquired.

When the imaging information at the time of first correction imaging largely differs from the imaging information at the time of X-ray imaging (i.e., with a large difference in an imaging parameter value between both pieces of imaging information), an offset correction image largely affected by the second correction image acquired (immediately) before X-ray imaging is acquired.

For example, with a small difference in imaging temperature between both pieces of imaging information ($\Delta temp$), the value of B (first correction factor) is large as illustrated in FIG. 3C and therefore an offset correction image largely affected by the first correction image is acquired.

Conversely, with a large difference in temperature at the time of both imaging between both pieces of imaging information ($\Delta temp$), the value of B (first correction factor) is small as illustrated in FIG. 3C and therefore an offset correction image slightly affected by the first correction image is acquired. Also in the case of the difference in electric charge accumulation time ($\Delta time$), a similar effect to the difference in temperature ($\Delta temp$) described above is obtained, as illustrated in FIG. 3B.

As described above, according to the first exemplary embodiment, a low-resolution image (second correction image (non-radiation imaging)) is captured at each time of radiation imaging, and an offset component is removed from the radiation image based on the low-resolution image and a high-resolution image (first correction image (non-radiation imaging)) captured in advance.

Thus, the first exemplary embodiment makes it possible to quickly perform imaging as well as improves the image quality even with a configuration in which the offset correction image is updated at each time of radiation imaging.

A second exemplary embodiment will be described below. FIG. 4 is a block diagram illustrating an exemplary functional configuration of a radiation imaging system (hereinafter referred to as X-ray imaging system) according to the second exemplary embodiment. In FIG. 4, the same reference numerals are assigned to elements having the same function as those in FIG. 1 illustrating the first exemplary embodiment, and duplicated explanations may be omitted. Differences from the first exemplary embodiment will be selectively described below.

The X-ray imaging apparatus 100 according to the second exemplary embodiment includes a control unit 101, an imaging unit 106, an offset correction processing unit 105, a correction image generation unit 120, and a correction image storage unit 124. The X-ray imaging apparatus 100 also includes switches 130 and 131.

The X-ray imaging apparatus 100 according to the second exemplary embodiment generates an offset correction image in a different way from that according to the first exemplary embodiment. More specifically, a reading unit 104 reads a part of pixel data in an imaging area, and the correction image generation unit 120 generates an offset correction image based on an output of the reading unit 104. In this case, X-ray irradiation is not performed. At the time of X-ray imaging, the reading unit 104 reads all the pixel data in the imaging area.

The correction image storage unit 124 stores the offset correction image that includes information about a dark current. The correction image generation unit 120 updates the offset correction image at each time of X-ray imaging.

More specifically, the correction image generation unit 120 combines the offset correction image stored in the correction image storage unit 124 with an image captured without X-ray irradiation to generate the offset correction image. The correction image storage unit 124 stores the generated offset correction image.

The offset correction processing unit 105 performs such correction (offset correction) as to remove an offset component from the X-ray image, by using the offset correction image. More specifically, the offset correction processing unit 105 subtracts the offset correction image stored in the correction image storage unit 124 from the output (X-ray image) of the reading unit 104 at the time of X-ray imaging.

An exemplary imaging operation in the X-ray imaging system according to the second exemplary embodiment will be described below with reference to FIG. 5.

The X-ray imaging apparatus 100 first performs imaging by driving all image capture elements. In this case, X-ray irradiation is not performed. When starting this imaging, the X-ray imaging apparatus 100 changes the switches 130 and 131 through the control unit 101.

With this switching, the switch 130 is connected to the correction image generation unit 120 and the switch 131 is disconnected from the offset correction processing unit 105. When this switching is completed, the X-ray imaging apparatus 100 controls the drive unit 102 and the reading unit 104 through the control unit 101 to perform imaging.

In step S200, the X-ray imaging apparatus 100 stores the output (image captured by all image capture elements) of the reading unit 104 in the correction image storage unit 124 through the correction image generation unit 120.

Then, the X-ray imaging apparatus 100 performs imaging by driving a part of image capture elements. In this case, X-ray irradiation is not performed. When starting this imaging, the X-ray imaging apparatus 100 changes the switches 130 and 131 through the control unit 101. With this switching, the switch 130 is connected to the correction image generation unit 120 and the switch 131 is disconnected from the offset correction processing unit 105.

When this switching is completed, in step S201, the X-ray imaging apparatus 100 controls the drive unit 102 and the reading unit 104 through the control unit 101 to perform imaging. Then, the X-ray imaging apparatus 100 combines the output (image captured by a part of image capture elements) of the reading unit 104 with the offset correction image stored in the correction image storage unit 124 through the correction image generation unit 120.

The offset correction image is updated with this combination. In step S202, the updated offset correction image is stored in the correction image storage unit 124.

Then, the X-ray imaging apparatus 100 starts imaging through X-ray irradiation. In this case, the X-ray imaging apparatus 100 changes the switches 130 and 131 through the control unit 101. With this switching, the switch 130 is disconnected from the reading unit 104 and the switch 131 is connected to the offset correction processing unit 105.

When this switching is completed, in step S203, the X-ray imaging apparatus 100 instructs the X-ray generation apparatus 200 through the control unit 101 to perform X-ray irradiation, and controls the drive unit 102 and the reading unit 104 to perform X-ray imaging. Then, the X-ray imaging apparatus 100 acquires an output (X-ray image) of the reading unit 104.

Then, the X-ray imaging apparatus 100 corrects the X-ray image captured in step S203 through the offset correction processing unit 105. Specifically, in step S204, the offset correction processing unit 105 subtracts the offset correction image from the X-ray image, thus acquiring an X-ray image from which the offset component is removed.

When this correction is completed, the X-ray imaging apparatus 100 transmits the corrected X-ray image to a display unit 300. In step S205, the display unit 300 displays the received X-ray image.

If X-ray imaging is performed again (YES in step S206), the processing returns to step S201. If imaging is terminated (NO in step S206), the processing in FIG. 5 ends.

Imaging by using a part of the image capture elements in step S201 will be described below.

Figure 6:
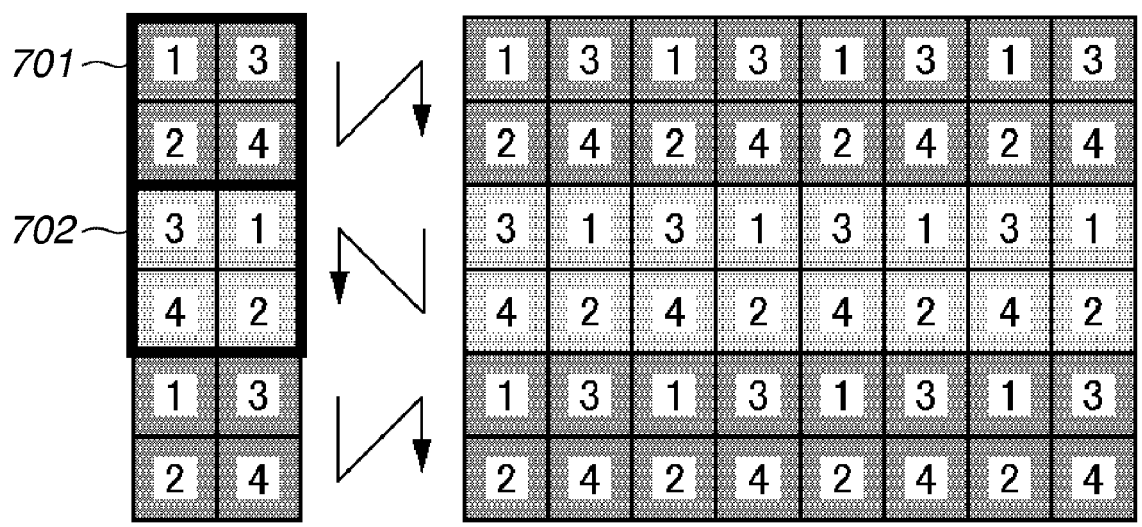
FIG. 6 illustrates an exemplary overview of imaging using a part of image capture elements in step S201 of FIG. 5.

Pixels in a captured image correspond to image capture elements on a one-to-one basis. As illustrated in FIG. 6, an image capture element group (matrix) is composed of a predetermined number of (in this case, four) image capture elements (pixels).

Although a square containing four image capture elements is defined as one image capture element group, the number of image capture elements in a group and its shape are not limited thereto but may be changed as required.

In each matrix, each of the image capture elements is assigned a number. This number denotes the order of imaging (driving and reading) at each time of non-X-ray imaging.

In a matrix 701, for example, an image capture element 1 at the top left is activated for first non-X-ray imaging, and an image capture element 2 at the bottom left is activated for second non-X-ray imaging. Likewise, an image capture element 3 at the top right is activated for third non-X-ray imaging, and an image capture element 4 at the bottom right is activated for fourth non-X-ray imaging. The X-ray imaging apparatus 100 repeats this sequence of four non-X-ray imaging operations by using different image capture elements in this way.

In a matrix 702, for example, an image capture element 1 at the top right is activated for first non-X-ray imaging, and an image capture element 2 at the bottom right is activated for second non-X-ray imaging. Likewise, an image capture element 3 at the top left is activated for third non-X-ray imaging, and an image capture element 4 at the bottom left is activated for fourth non-X-ray imaging.

The above-mentioned two different types of matrices (matrices 701 and 702) are vertically arranged in alternation while the same type of matrices are horizontally arranged. More specifically, in each of horizontally arranged matrices, image capture elements are activated for imaging in the same order. In each of vertically arranged matrices, image capture elements are activated for imaging in one of a plurality of (in this case, two) orders.

With the above-described imaging control, a different image capture element is used at each time of non-X-ray imaging, for example, in order of 1, 2, 3, and 4. In the horizontal direction, image capture elements are activated for imaging in an interlaced way at a time, as illustrated in FIG. 7. That is, the rows are alternately activated for imaging at each time of non-X-ray imaging.

If imaging is performed only with the matrix 701 without using the matrix 702, image capture elements are activated for imaging, for example, in a way illustrated in FIG. 8. In this case, however, since any one row or column of pixels may not entirely be refreshed in the offset correction image, visible artifacts may be generated in the corrected X-ray image.

As described above, according to the second exemplary embodiment, a part of image capture elements are driven at each time of X-ray imaging to perform imaging (non-X-ray imaging), and then the prestored offset correction image is updated by using the captured image.

Thus, similar to the first exemplary embodiment, the second exemplary embodiment makes it possible to quickly perform imaging and improve the image quality even with the configuration in which the offset correction image is updated at each time of X-ray imaging.

Further, at the time of non-X-ray imaging, image capture elements in two different types of matrices are activated for imaging based on the order assigned to these image capture elements in each matrix and on the row position of each matrix. Then, the offset correction image is updated based on the result.

This configuration makes it possible to acquire an offset correction image that enables more appropriate offset correction than a case without this configuration. Therefore, in a radiation image, noise due to an effect of the offset correction image can be suppressed.

Although the present invention has specifically been described based on typical exemplary embodiments, the present invention is not limited thereto but may be modified as appropriate without departing from the scope of the invention.

For example, in the configuration according to the second exemplary embodiment, it is also possible to update the offset correction image by using data for past several times of non-X-ray imaging. For example, data for each pixel for past several (for example, four) times of non-X-ray imaging and data for one image are stored in the correction image storage unit 124. The correction image storage unit 124 deletes the oldest pixel data each time new pixel data is acquired.

At each time of non-X-ray imaging, the correction image generation unit 120 obtains an average value for pixel data for past four times of imaging including the captured image and refreshes corresponding pixels in the offset correction image. According to this configuration, an X-ray image having little or no artifacts can be acquired.

The present invention can be embodied, for example, as a system, an apparatus, a method, a program, or a recording medium. More specifically, the present invention can be applied to a system including a plurality of devices or to an apparatus including only one device.

Further, the present invention also includes a case where software or a program is directly or remotely supplied to a system or apparatus, and a computer built therein loads and executes the supplied program code, thus implementing the functions of the above-described exemplary embodiments. In this case, the supplied program is a computer program corresponding to the flow charts illustrated in FIGS. 2 and 5.

Therefore, in order to implement the functional processing of the present invention by using a computer, the program code itself installed therein also attains the present invention. That is, the computer program itself for implementing the functional processing of the present invention is included in the present invention. In this case, the program may be supplied as an object code, a program executed by an interpreter, and script data supplied to an operating system (OS), as long as it functions as a program.

A computer-readable recording medium for supplying the computer program may be, for example, a floppy disk, a hard disk, an optical disk, a magneto-optical disk (MO), a compact disk read-only memory (CD-ROM), a compact disk recordable (CD-R), a compact disk rewritable (CD-RW), a magnetic tape, a non-volatile memory card, a ROM, a digital versatile disk (DVD) including DVD-ROM and DVD-R, and so on.

Further, the computer program can also be supplied, for example, from a homepage on the Internet by using a browser of a client computer and downloading the program of the present invention therefrom to a recording medium such as a hard disk. In this case, the program to be downloaded may be a compressed file having an automatic installation function.

Further, the program of the present invention can also be supplied by splitting its program code into a plurality of files, and downloading each file from different homepages. That is, the present invention also includes a WWW server that allows a plurality of users to download program files for implementing the functional processing of the present invention.

Further, the program of the present invention can also be delivered to users as an encrypted program stored in a recording medium such as a CD-ROM. In this case, it is also possible to allow a user satisfying predetermined conditions to download encryption key information from a homepage through the Internet, execute the encrypted program by using the encryption key information, and install the program in a computer.

The functions of the above-mentioned exemplary embodiments are implemented when the computer loads and executes the program. Further, the functions of the above-mentioned exemplary embodiments may also be implemented in collaboration with the OS operating on the computer based on instructions of the program. In this case, for example, the OS performs a part or all of the actual processing, and the functions of the above-mentioned exemplary embodiments are implemented by the processing.

Further, a part or all of the functions of the above-mentioned exemplary embodiments may be implemented by writing the program read from the recording medium to a memory built in a function expansion board inserted into the computer or a function expansion unit connected thereto. In this case, after the program has been written to the function expansion board or function expansion unit, a CPU built in the function expansion board or function expansion unit executes a part or all of the actual processing based on instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-017130 filed Jan. 28, 2009, which is hereby incorporated by reference herein in its entirety.

What is claimed is:

1. An apparatus comprising:
    an imaging unit configured to perform imaging by using a plurality of image capture elements for accumulating electric charges;
    a storage unit configured to store a first image to be acquired by driving the image capture elements without causing the image capture elements to receive light, before imaging is performed by causing the image capture elements to receive light:
        an acquisition unit configured to acquire a second offset image to be acquired by driving a smaller number of image capture elements than a number of image capture elements to be driven when the first image is acquired without causing the smaller number of image capture elements to receive light, according to imaging by causing the plurality of image capture elements to receive light;
    a generation unit configured to generate an offset correction image to be used for correcting an image to be acquired by causing the plurality of image capture elements to receive light by combining the first image and the second image with a factor according to imaging information on the imaging by causing the plurality of image capture elements to receive light.

2. The apparatus according to claim 1, wherein the image capture elements correspond to pixels of the captured image on a one-to-one basis and a predetermined number of image capture elements are collected as a group.

3. The apparatus according to claim 2,
    wherein, at each time of imaging by using a part of the plurality of image capture elements without radiant-ray irradiation to obtain the second offset image, the imaging unit performs imaging by sequentially activating image capture elements in each of the image capture element groups.

4. The apparatus according to claim 3,
    wherein, when capturing an image by using the part of the plurality of image capture elements without radiant-ray irradiation to obtain the second offset image, the imaging unit activates image capture elements in the same order in each of horizontally arranged image capture element groups, and activates image capture elements in one of a plurality of orders in each of vertically arranged image capture element groups.

5. The apparatus according to claim 2, wherein the image capture elements are two-dimensionally arranged.

6. The apparatus according to claim 5, wherein, at each time of imaging without radiant-ray irradiation, the imaging unit alternately selects one row in each image capture element group.

7. The apparatus according to claim 1, wherein the generation unit acquires an average value from past data obtained as a result of imaging without radiant-ray irradiation, and updates the offset correction image by using an average value.

8. The apparatus according to claim 1, further comprising a correction processing unit configured to correct the radiation image by subtracting the offset correction image from the radiation image.

9. The apparatus according to claim 1, wherein the storage unit stores the first offset image to be acquired before imaging a moving image is started, in case of imaging a moving image.

10. The apparatus according to claim 1,
    wherein the acquisition unit repeatedly acquires the second image, and
    wherein the generation unit updates the offset correction image based on the repeatedly acquired second image.

11. The apparatus according to claim 1, further comprising:
    a calculation unit configured to calculate a correction factor according to a difference between imaging information on the first image and imaging information on imaging by causing the plurality of image capture elements to receive light.

12. The apparatus according to claim 1,
    wherein the first image and the second image are acquired by performing imaging without irradiating the plurality of image capture elements with a radiant ray, and
    wherein an image of a subject is acquired by performing imaging by irradiating the plurality of image capture elements with a radiant ray.

13. A method for an imaging apparatus that performs imaging by using a plurality of image capture elements for accumulating electric charges, the method comprising:
    acquiring a first offset image to be acquired by driving the image capture elements without causing the image capture elements to receive light, before imaging is performed by causing the image capture elements to receive light;
    acquiring a second offset image to be acquired by driving a smaller number of image capture elements than a number of image capture elements to be driven when the first image is acquired without causing the smaller number of image capture elements to receive light, according to imaging by causing the plurality of image capture elements to receive light;
    generating an offset correction image to be used for correcting an image to be acquired by causing the plurality of image capture elements to receive light by combining the first image and the second image with a factor according to imaging information on the imaging by causing the plurality of image capture elements to receive light; and
    performing correction processing by correcting a captured image to be acquired when imaging is performed by the causing image capture element to receive light, based on the offset correction image.

14. The method according to claim 13, wherein the image capture elements correspond to pixels of the captured image on a one-to-one basis and a predetermined number of image capture elements are collected as a group.

15. The method according to claim 14, further comprising, at each time of imaging by using a part of the plurality of image capture elements without radiant-ray irradiation to obtain the second offset image, performing imaging by sequentially activating image capture elements in each of the image capture element groups.

16. The method according to claim 15, further comprising, when capturing an image by using the part of the plurality of image capture elements without radiant-ray irradiation to obtain the second offset image, activating image capture elements in the same order in each of horizontally arranged image capture element groups, and activating image capture elements in one of a plurality of orders in each of vertically arranged image capture element groups.

17. The method according to claim 16, further comprising, at each time of imaging without radiant-ray irradiation, alternately selecting one row in each image capture element group.

18. The method according to claim 13, further comprising acquiring an average value from past data obtained as a result of imaging without radiant-ray irradiation, and updating the offset correction image by using an average value.

19. The method according to claim 13 further comprising correcting the radiation image by subtracting the offset correction image from the radiation image.

20. A non-transitory computer readable medium storing a computer-executable program of instructions for causing a computer to perform a method comprising:
acquiring a first offset image to be acquired by driving the image capture elements without causing the image capture elements to receive light, before imaging is performed by causing the image capture elements to receive light;
acquiring a second offset image to be acquired by driving a smaller number of image capture elements than a number of image capture elements to be driven when the first image is acquired without causing the smaller number of image capture elements to receive light, according to imaging by causing the plurality of image capture elements to receive light;
generating a offset correction image to be used for correcting an image to be acquired by causing the plurality of image capture elements to receive light by combining the first image and the second image with a factor according to imaging information on the imaging by causing the plurality of image capture elements to receive light; and
correcting a captured image to be acquired when imaging is performed by the causing image capture element to receive light, based on the offset correction image.

21. The non-transitory computer readable medium according to claim 20, further comprising: at each time of imaging by using a part of the plurality of image capture elements without radiant-ray irradiation to obtain the second offset image, the performing imaging by sequentially activating image capture elements in each of the image capture element groups.

22. The non-transitory computer readable medium according to claim 20, further comprising acquiring an average value from past data obtained as a result of imaging without radiant-ray irradiation, and updating the offset correction image by using an average value.

23. The non-transitory computer readable medium according to claim 20, further comprising correcting the radiation image by subtracting the offset correction image from the radiation image.

24. An apparatus comprising:
an imaging unit configured to perform imaging by using a plurality of image capture elements for accumulating electric charges;
a storage unit configured to store a first image to be acquired by driving the image capture elements without causing the image capture elements to receive light, before imaging is performed by causing the image capture elements to receive light:
an acquisition unit configured to acquire a second offset image to be acquired by driving a smaller number of image capture elements than a number of image capture elements to be driven when the first image is acquired without causing the smaller number of image capture elements to receive light;
a generation unit configured to generate an offset correction image to be used for correcting an image to be acquired by causing the plurality of image capture elements to receive light based on the first image and the second image.

* * * * *